United States Patent
Boren

(10) Patent No.: US 9,051,052 B2
(45) Date of Patent: Jun. 9, 2015

(54) SINGLE AISLE AIRCRAFT LAVATORY WITH OPTIMIZED USE OF FLOOR SPACE FOR WHEELCHAIR ACCESSIBILITY

(71) Applicant: The Boeing Company, Chicago, IL (US)

(72) Inventor: Kelly L. Boren, Marysville, WA (US)

(73) Assignee: The Boeing Company, Chicago, IL (US)

(*) Notice: Subject to any disclaimer, the term of this patent is extended or adjusted under 35 U.S.C. 154(b) by 193 days.

(21) Appl. No.: 13/661,994

(22) Filed: Oct. 26, 2012

(65) Prior Publication Data
US 2014/0117156 A1    May 1, 2014

(51) Int. Cl.
*B64D 11/02*    (2006.01)
(52) U.S. Cl.
CPC .................... *B64D 11/02* (2013.01)
(58) Field of Classification Search
CPC ........................................ B64D 11/02
USPC ..................................... 244/118.5
See application file for complete search history.

(56) References Cited

U.S. PATENT DOCUMENTS

| | | | |
|---|---|---|---|
| 5,474,260 A * | 12/1995 | Schwertfeger et al. | 244/118.5 |
| 7,222,820 B2 | 5/2007 | Wentland et al. | |
| 7,275,716 B2 | 10/2007 | Saint-Jalmes | |
| 7,354,018 B2 | 4/2008 | Saint-Jalmes | |
| 7,866,603 B2 | 1/2011 | Cooper et al. | |
| 8,672,267 B2 * | 3/2014 | Schliwa et al. | 244/118.6 |
| 8,720,827 B2 * | 5/2014 | Boren | 244/129.5 |
| 2007/0108346 A1 * | 5/2007 | Zwaan | 244/118.5 |
| 2009/0032642 A1 * | 2/2009 | Zwaan | 244/118.5 |
| 2012/0261509 A1 * | 10/2012 | Grant et al. | 244/118.5 |
| 2013/0056583 A1 * | 3/2013 | Schliwa et al. | 244/118.5 |
| 2013/0334369 A1 * | 12/2013 | Schliwa et al. | 244/118.5 |
| 2014/0048650 A1 * | 2/2014 | Schliwa et al. | 244/118.5 |
| 2014/0077033 A1 * | 3/2014 | Scown et al. | 244/118.5 |
| 2014/0138483 A1 * | 5/2014 | Schliwa et al. | 244/118.5 |
| 2014/0291445 A1 * | 10/2014 | Brauer et al. | 244/118.5 |

FOREIGN PATENT DOCUMENTS

WO    WO 2011086502 A1 *    7/2011
WO    WO2012110643    8/2012

OTHER PUBLICATIONS

European Search Report dated Mar. 4, 2014 in co-pending EPO Patent Application No. 13188732.5.

* cited by examiner

*Primary Examiner* — Philip J Bonzell
*Assistant Examiner* — Michael Kreiner
(74) *Attorney, Agent, or Firm* — Joseph M. Rolnicki; Evans & Dixon, L.L.C.

(57)    ABSTRACT

An aircraft cabin has a lavatory that is accessible from a cross-aisle of the aircraft and in which the toilet is moved from the typical outboard location to an inboard location where increased head room enables the toilet to be positioned in tight proximity to a back wall of the lavatory directly behind the toilet and thereby increases an open area of floor surface in front of the toilet for wheelchair access to the lavatory.

20 Claims, 5 Drawing Sheets

SINGLE AISLE AIRCRAFT LAVATORY WITH OPTIMIZED USE OF FLOOR SPACE FOR WHEELCHAIR ACCESSIBILITY

FIELD

The present invention pertains to the configuration of a wheelchair accessible lavatory in an aircraft. In particular, the present invention pertains to an aircraft cabin having a central aisle and a cross-aisle, and a lavatory that is accessible from the cross-aisle of the aircraft. In the lavatory, the toilet is moved from the typical outboard location to an inboard location where increased head room enables the toilet to be positioned in tight proximity to a back wall of the lavatory directly behind the toilet. This positioning of the toilet increases an open area of floor surface in front of the toilet for wheelchair accessibility.

BACKGROUND

Commercial aircraft set up for the transportation of passengers typically include rows of seats along the length of the aircraft cabin that are separated by a central aisle and one or more lavatories in the cabin that are accessible from the central aisle. Because the primary purpose of a commercial aircraft is to transport passengers, the aircraft cabin is usually set up to maximize the number of seats in the cabin. As a result, it is challenging to provide adequate lavatory space without reducing seat count.

A typical passenger aircraft includes at least one lavatory enclosure that is positioned along the central aisle of the aircraft among the rows of seats. The lavatory enclosure is accessed through a doorway from the central aisle. The width of the lavatory enclosure is typically not much larger than the width of the doorway. The toilet of the lavatory is typically positioned with its back toward an outboard sidewall of the aircraft cabin and its front facing inboard toward the lavatory doorway. Due to the cylindrical configuration of the aircraft body, the sidewall of the aircraft cabin typically curves inwardly or in an inboard direction as it extends upwardly from the floor surface of the aircraft cabin. Because of the curved configuration of the cabin sidewall, the toilet in the lavatory is spaced laterally inwardly or in an inboard direction from the sidewall in order to provide sufficient headroom for a user of the lavatory when standing in front of, or when sitting on the toilet. The need to position the toilet laterally inwardly from the aircraft cabin sidewall to provide adequate head room reduces the area of floor surface between the front of the toilet and the lavatory doorway. This reduced area of floor surface between the toilet and the lavatory doorway makes it difficult for a passenger in a wheelchair to use the lavatory, and in some situations may prevent a passenger in a wheelchair from using the lavatory.

SUMMARY

The aircraft of the present invention includes a lavatory that overcomes the disadvantages associated with prior art aircraft lavatories discussed above. This is accomplished by reconfiguring the lavatory and repositioning the lavatory toilet in the aircraft cabin away from the outboard sidewall of the aircraft cabin.

The lavatory occupies basically the same floor surface area of a typical aircraft lavatory that is accessible through a doorway on the central aisle of the aircraft. The lavatory is positioned adjacent a cross-aisle at the rear of the aircraft cabin at the intersection of the cross-aisle with the central aisle. The lavatory could be positioned in other areas of the aircraft cabin adjacent any cross-aisle.

The lavatory includes an inboard back wall this is positioned adjacent the central aisle of the aircraft cabin and is spaced laterally inwardly or inboard from the outboard sidewall of the aircraft cabin. The back wall is substantially flat and extends vertically upwardly from the floor surface to the top of the aircraft cabin, and extends longitudinally through the aircraft cabin between a forward edge and a rearward edge of the back wall. The lavatory also includes a forward sidewall that extends vertically upwardly from the floor surface and laterally through the aircraft cabin between the outboard sidewall of the aircraft cabin and the forward edge of the back wall. The lavatory also includes an aft sidewall positioned at the aft end of the lavatory. The aft sidewall extends vertically upwardly from the floor surface and laterally between the outboard sidewall of the aircraft cabin and the rearward edge of the inboard back wall. The doorway to the lavatory is in the aft sidewall.

The toilet of the lavatory is positioned on the floor surface with the back of the toilet adjacent the back wall of a lavatory. The back of the toilet faces toward the back wall and the front of the toilet faces toward the outboard sidewall of the aircraft cabin. Because the back wall is substantially flat as opposed to the vertically curved outboard sidewall of the aircraft cabin, the toilet can be positioned in close proximity to the back wall while still providing adequate head room for a person standing in front of or sitting on the toilet. Additionally, positioning the back of the toilet in tight proximity to the back wall of the lavatory creates an open area of the floor surface in the lavatory between the outboard sidewall of the aircraft cabin and the front of the toilet. The open area of floor surface is dimensioned to accommodate an onboard wheelchair. For example 29 inches by 29 inches. This open area is sufficient to enable an onboard wheelchair that is 13 inches wide and 24 inches deep to be easily rotated in the open area.

The doorway through the aft sidewall of the lavatory is accessible from the cross-aisle. The doorway is positioned laterally toward the outboard sidewall of the aircraft cabin and laterally away from the back wall and the toilet of the lavatory. This positions the doorway between the open area of the floor surface dimensioned to accommodate an onboard wheelchair inside the lavatory and the cross-aisle outside of the lavatory.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

Further features of the aircraft lavatory of the invention are set forth in the following detailed description of the aircraft and in the drawing figures.

DESCRIPTION

Figure 1:
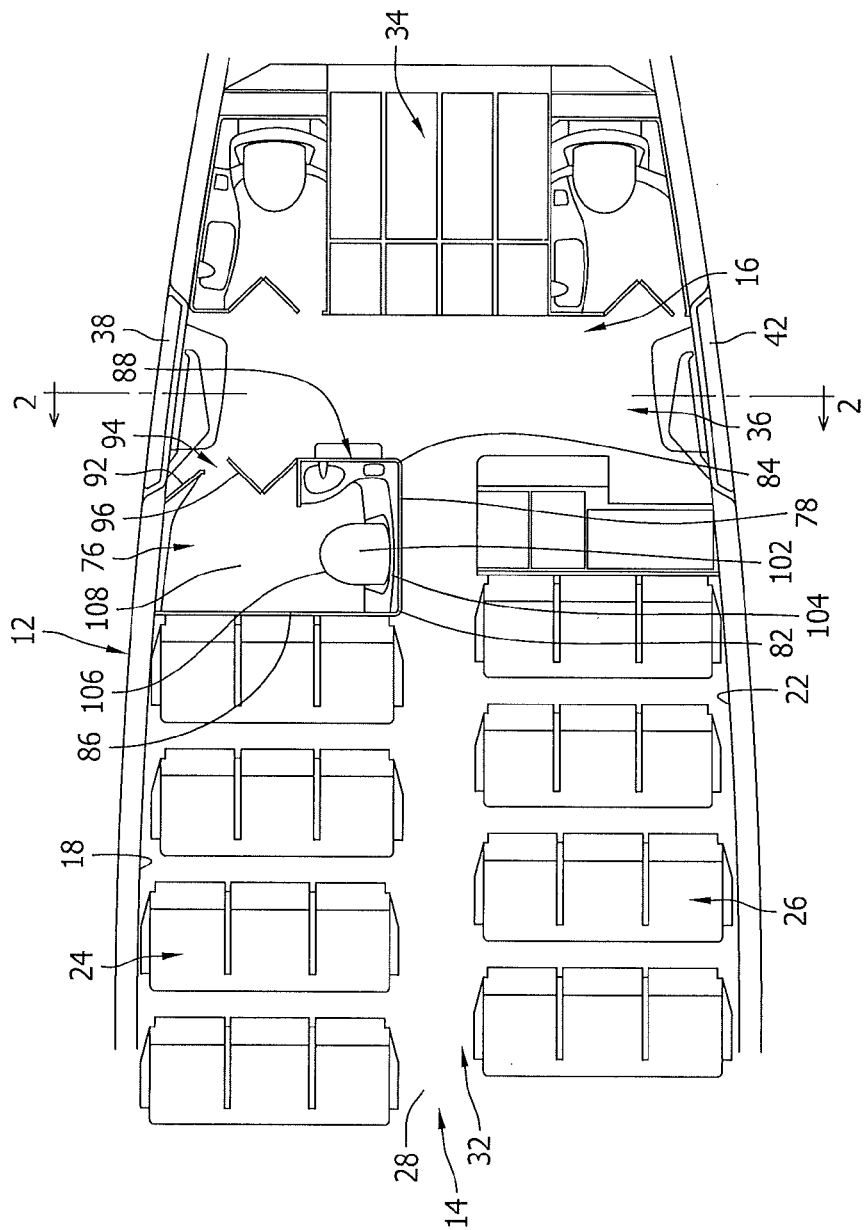
FIG. 1 is a representation of a portion of a conventional aircraft floor plan at the rear of the aircraft cabin showing the typical locations of lavatories of the aircraft relative to the passenger seating and the galley of the aircraft.

FIG. 1 is a representation of the floor plan at the rear of a typical aircraft cabin where lavatories of the aircraft are located. In FIG. 1 a rearward portion of the aircraft fuselage or body 12 that surrounds the aircraft cabin is shown in cross section. The aircraft cabin has a longitudinal length between a front 14 of the cabin and a rear 16 of the cabin. The cabin also has a lateral width between opposite first 18 and second 22 outboard sidewalls of the aircraft cabin. Due to the cylindrical configuration of the aircraft body, the first 18 and second 22 sidewalls of the cabin curve inwardly or toward the center of the aircraft cabin as they extend vertically upwardly.

A plurality of rows of seats 24, 26 are arranged on the floor surface 28 of the aircraft cabin. The rows of seats 24, 26 are arranged on laterally opposite sides of the cabin and define a central aisle 32. The central aisle 32 extends longitudinally through the cabin across the floor surface 28 between the front 14 and rear 16 of the cabin and between the rows of seats 24, 26. A galley space or stowage space 34 is provided in the rear of the cabin at the rearward end of the central aisle 32.

A cross-aisle 36 extends laterally across the rear 16 of the cabin in front of the space 34. The cross-aisle 36 extends between a pair of first 38 and second 42 boarding doors in the respective first 18 and second 22 sidewalls of the aircraft cabin.

In the example shown in FIG. 1, a traditional aircraft may include three lavatory enclosures 52, 54, 56. Each of the enclosures is accessible through a respective door 62, 64, 66 of the enclosures 52, 54, 56. As can be seen in FIG. 1, the width dimension of each of the lavatory enclosures 52, 54, 56 is set in order to maximize the passenger seating in the aircraft cabin. The width of each lavatory enclosure 52, 54, 56 is not much larger than the width of its respective door 62, 64, 66. Each of the lavatory enclosures 52, 54, 56 contains a respective toilet 68, 72, 74. As can be seen in FIG. 1, each of the toilets 68, 72, 74 is spaced laterally inwardly or in an inboard direction from the first 18 and second 22 outboard sidewalls of the aircraft cabin. This is because the first 18 and second 22 sidewalls of the aircraft cabin curve inwardly as the sidewalls extend vertically upwardly from the floor surface 28 of the aircraft cabin. The curved configurations of the sidewalls 18, 22 decrease the head room inside the lavatories as the sidewalls are approached from the doorways of the lavatories.

In a preferred embodiment, an aircraft is reconfigured such that the lavatory enclosure in a manner that enables the toilet of the lavatory enclosure may be repositioned away from the outboard sidewall of the aircraft cabin and away from the limited head room adjacent the sidewall.

Figure 2:
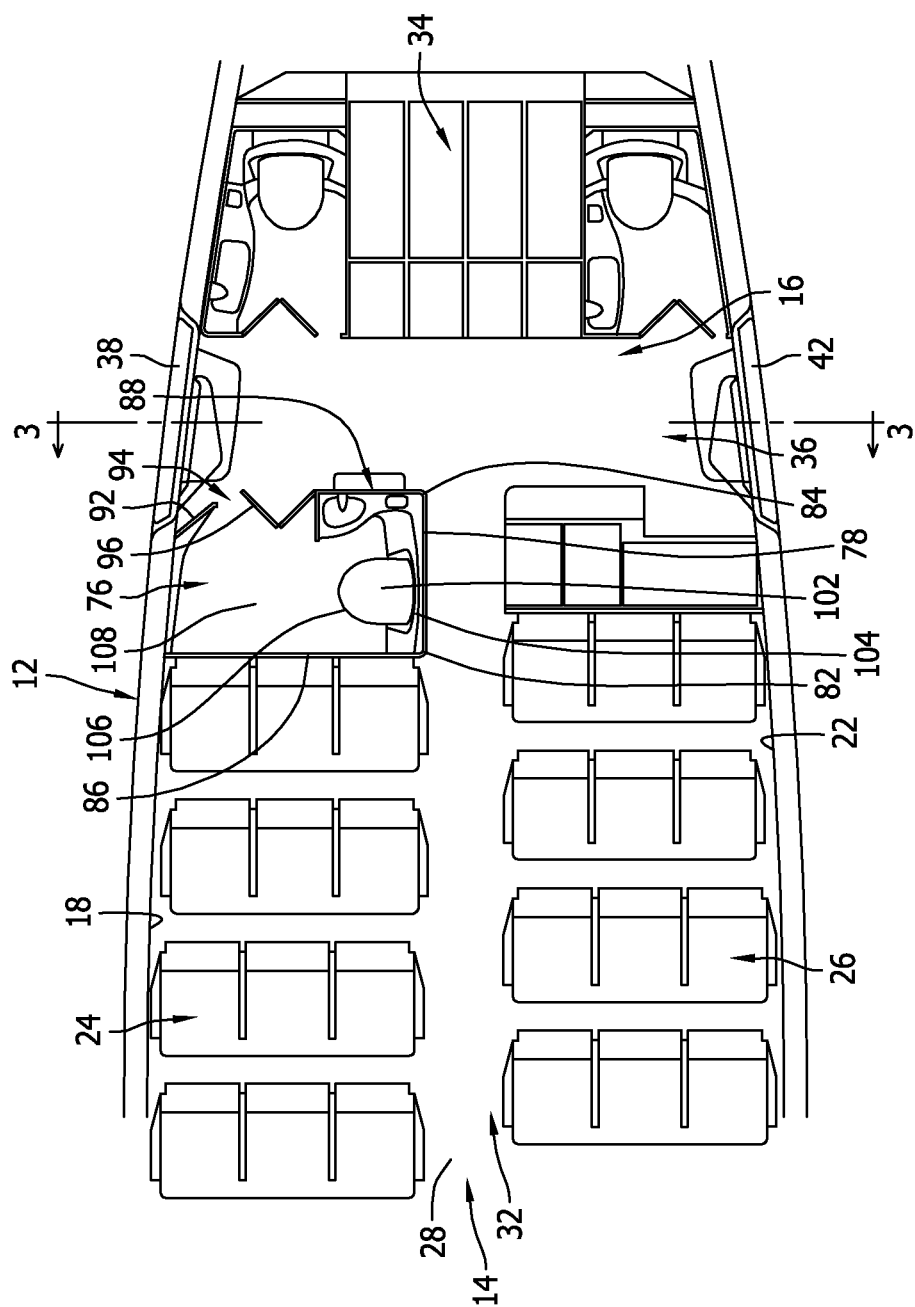
FIG. 2 is a representation of the floor plan at the rear of the aircraft of the invention with the lavatory and toilet of the invention.
Figure 3:
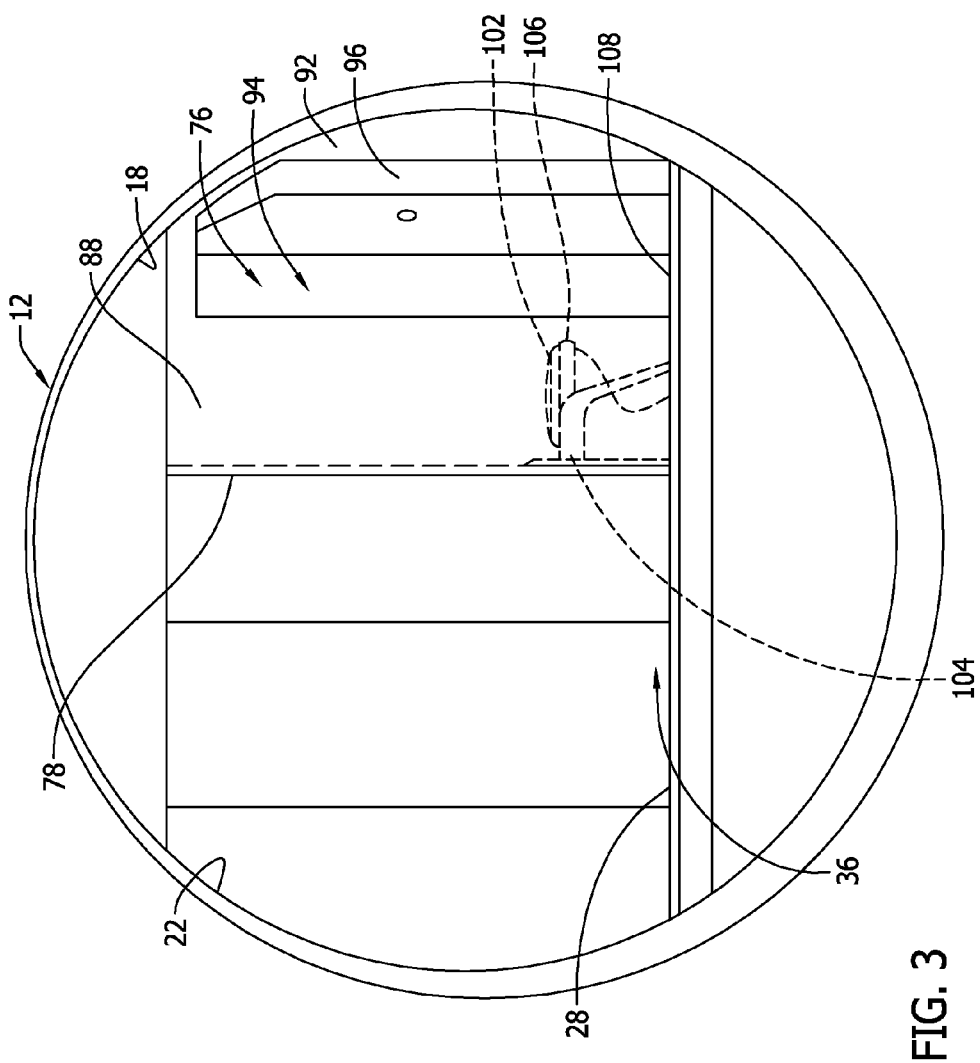
FIG. 3 is a representation of a cross section view of the aircraft cabin and the lavatory and toilet of the invention.

As shown in FIGS. 2 and 3 the lavatory 76 includes a back wall 78 that is positioned adjacent the central aisle 32 and is spaced laterally inwardly or in an inboard direction from the first sidewall 18 of the aircraft cabin. The back wall 78 is substantially flat and extends vertically upwardly from the floor surface 28 to the top of the aircraft cabin. Due to the vertical curvature of the first sidewall 18 of the aircraft cabin, there is significantly more head room adjacent the back wall 78 inside the lavatory 76 than there is adjacent the first sidewall 18. The back wall 78 also extends longitudinally through the aircraft cabin adjacent the central aisle 32 between a forward edge 82 and a rearward edge 84 of the back wall. The lavatory 76 also includes a substantially flat forward sidewall 86 that extends vertically upwardly from the floor surface 28 to the top of the aircraft cabin. The forward sidewall 86 extends laterally through the aircraft cabin between the first sidewall 18 of the aircraft cabin and the forward edge 82 of the back wall 78. The lavatory further includes an aft sidewall 88 that extends vertically upwardly from the floor surface 28 to the top of the aircraft cabin. The aft sidewall 88 extends laterally between the rearward edge 84 of the back wall 78 and the first sidewall 18 of the aircraft cabin. A portion of the aft sidewall 92 may curve as it approaches the first cabin sidewall 18 if needed to accommodate a hinge mechanism of the adjacent boarding door 38. The necessity of this curvature will depend on the location of the lavatory to the boarding door. The doorway 94 to the lavatory 76 is provided through the aft sidewall 88. The doorway is positioned adjacent to the aft sidewall of the aircraft cabin. A bi-fold door 96 in the doorway 94 is attached to the aft sidewall 88. The bi-fold door 96 opens into the lavatory 76. Preferably, the bi-fold construction of the door 96 occupies a minimum amount of space in the lavatory 76 when the door is open.

Figure 4:
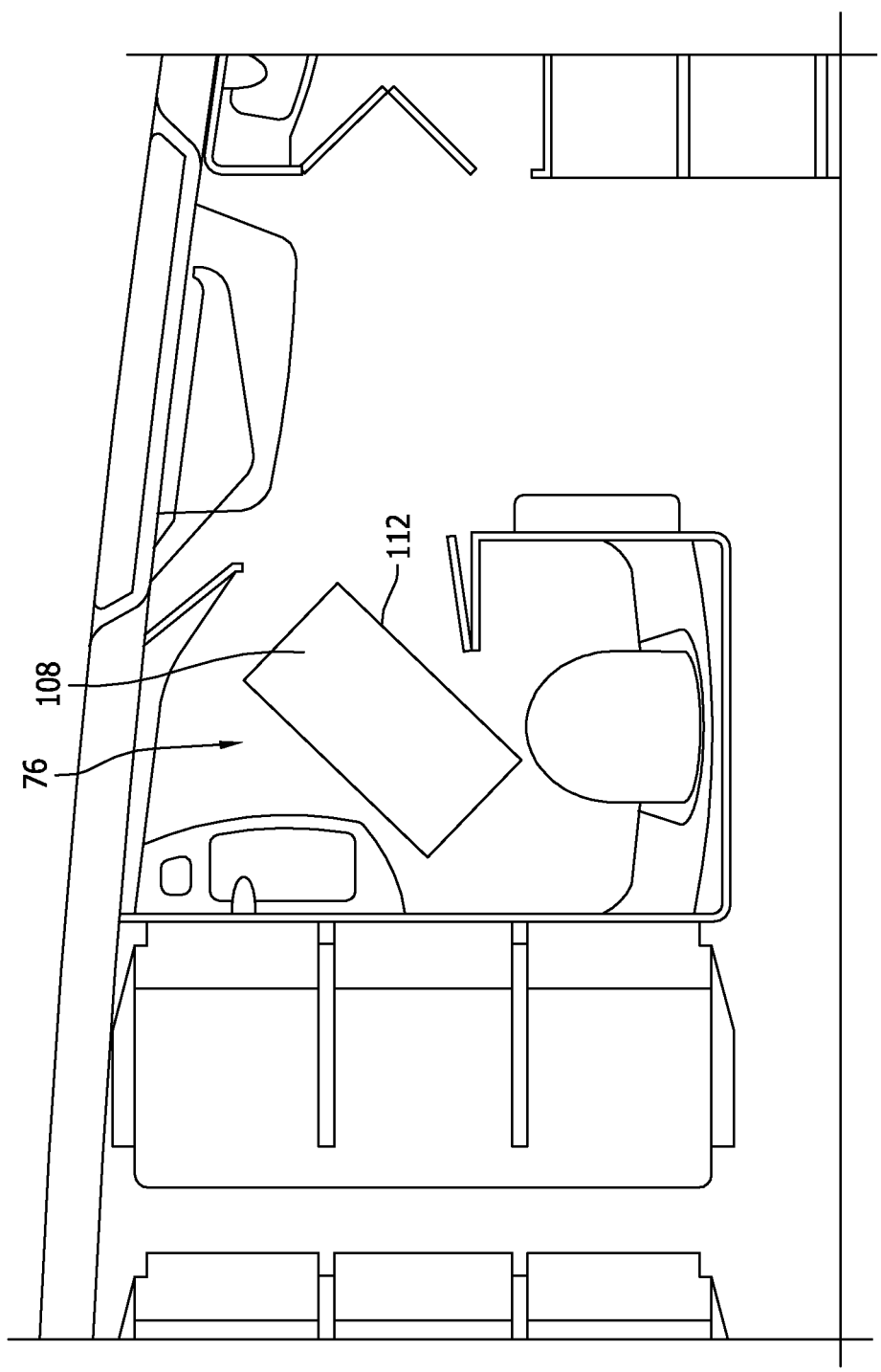
FIG. 4 is a representation of an onboard wheelchair in the lavatory of the invention.
Figure 5:
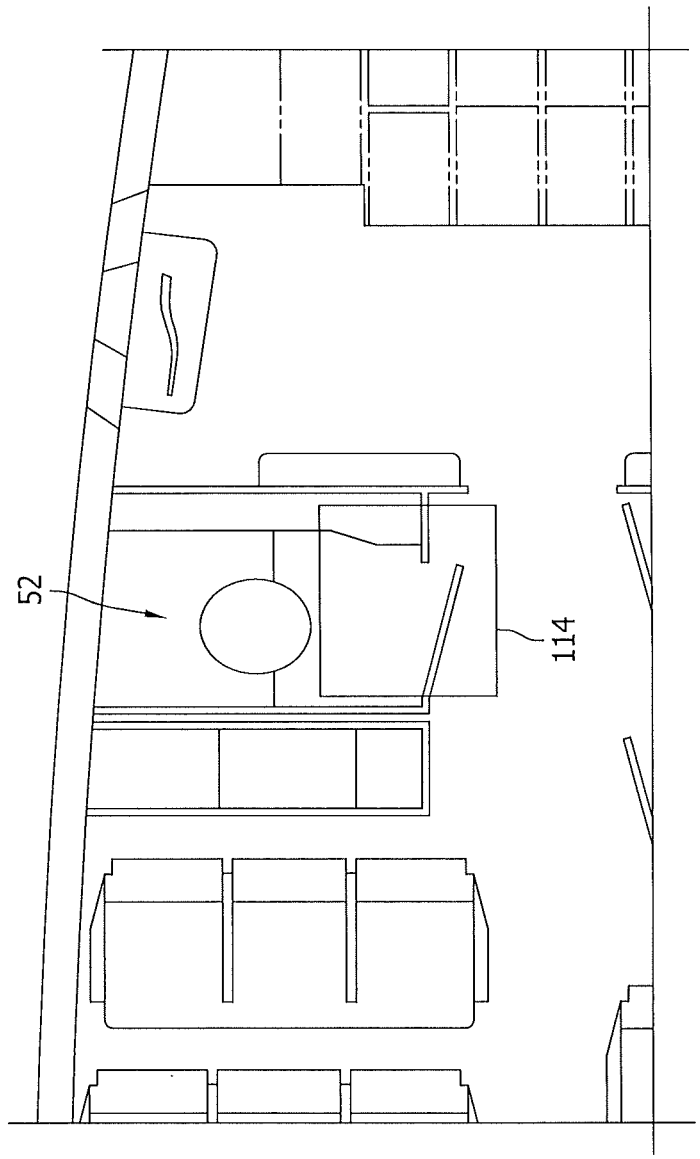
FIG. 5 is a representation of the open area of floor space in the lavatory of the invention compared to a lavatory of FIG. 1.

The toilet 102 of the lavatory 76 is positioned on the floor surface 28 inside the lavatory with the back 104 of the toilet adjacent the back wall 78 of the lavatory. With the back 104 of the toilet 102 facing toward the back wall 78, the front 106 of the toilet faces toward the first sidewall 18 of the aircraft cabin. Because the back wall 78 is substantially flat as opposed to the vertically curved configuration of the first sidewall 18 of the aircraft cabin, the toilet 102 can be positioned in close proximity to the back wall 78 while still providing adequate head room for a person of median height standing in front of or sitting on the toilet 102. Comparing FIGS. 1 and 3, it can be seen that the toilet 102 is positioned significantly closer to the back wall 78 than the toilets 68, 72, 74 are positioned relative to the first 18 and second 22 sidewalls of the aircraft cabin. Additionally, positioning the back 104 of the toilet 102 in close proximity to the back wall 78 of the lavatory increases the lateral distance or spacing between the front 106 of the toilet 102 and the first sidewall 18 of the aircraft cabin. Increasing the lateral distance of the front 106 of the toilet 102 from the first cabin sidewall 18 creates an open area 108 of the floor surface in the lavatory 76 between the first cabin sidewall 18 and of the front 106 of the toilet. This open area 108 of floor surface, for example 29 inches by 29 inches, is dimensioned to accommodate an onboard wheelchair in the lavatory 76 with the lavatory door 96 closed. FIG. 4 shows an example of the space occupied by an onboard wheelchair 112 that is 13 inches wide and 24 inches deep in the open area 108 of the floor surface in the lavatory 76. FIG. 5 shows the example of the 29 inches by 29 inches open area 114 compared to the floor space of one of the lavatories 52 of FIG. 1.

As shown in FIG. 2, the lavatory door 94 may be positioned laterally toward the first sidewall 18 of the aircraft cabin and laterally away from the back wall 78 and toilet 102 of the lavatory. This positions the doorway 94 between the open area 108 of the floor surface and the cross-aisle 36. With this positioning of the door 94, the open area 104 of the floor surface is easily accessible from the cross-aisle 36.

As various modifications could be made in the construction of the invention herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above described exemplary embodiments, but should be defined only in accordance with the following claims appended hereto and their equivalents.

The invention claimed is:

1. An aircraft comprising:
an aircraft body containing an aircraft cabin, the aircraft cabin having a longitudinal length between a front of the aircraft cabin and a rear of the aircraft cabin, and the aircraft cabin having a lateral width between opposite first and second sidewalls of the aircraft cabin;
a floor surface in the aircraft cabin;
the first sidewall of the aircraft cabin curving laterally inwardly over the aircraft cabin as the first sidewall of the aircraft cabin extends vertically upwardly from the floor surface;
a lavatory enclosure in the aircraft cabin;
a lavatory back wall in the aircraft cabin, the lavatory back wall being laterally spaced from the first sidewall of the aircraft cabin, the lavatory back wall and the first sidewall of the aircraft cabin being laterally opposite walls of the lavatory enclosure, the lavatory back wall extending vertically upwardly from the floor surface and extending longitudinally through the aircraft cabin between a forward edge of the lavatory back wall and a rearward edge of the lavatory back wall;
a lavatory forward sidewall in the aircraft cabin, the lavatory forward sidewall extending vertically upwardly from the floor surface and extending laterally through the aircraft cabin between the first sidewall of the aircraft cabin and the forward edge of the lavatory back wall;
a lavatory aft sidewall in the aircraft cabin, the lavatory aft sidewall extending vertically upwardly from the floor surface and extending laterally between the first sidewall of the aircraft cabin and the rearward edge of the lavatory back wall, the lavatory forward sidewall and the lavatory aft sidewall being longitudinally opposite walls of the lavatory enclosure; and,
a toilet in the lavatory enclosure, the toilet being positioned on the floor surface adjacent the lavatory back wall and laterally spaced from the first sidewall of the aircraft cabin, the toilet having a front and a back with the back of the toilet facing the lavatory back wall and the front of the toilet facing the first sidewall of the aircraft cabin.

2. The aircraft of claim 1, further comprising:
the lavatory back wall being substantially flat.

3. The aircraft of claim 1, further comprising:
a doorway in the lavatory aft sidewall; and,
there being an open area of the floor surface in the lavatory enclosure between the toilet and the first sidewall of the aircraft cabin, the open area of the floor surface being dimensioned to accommodate a wheelchair and being longitudinally adjacent the doorway.

4. The aircraft of claim 1, further comprising:
a plurality of rows of seats on the floor surface, the rows of seats being arranged on laterally opposite sides of the aircraft cabin and defining a central aisle laterally between the rows of seats and extending longitudinally across the floor surface between the front of the aircraft cabin and the rear of the of-the-aircraft cabin; and,
the lavatory forward sidewall being positioned in the aircraft cabin rearwardly of one of the rows of seats.

5. The aircraft of claim 1, further comprising:
a plurality of rows of seats on the floor surface, the rows of seats being arranged on laterally opposite sides of the aircraft cabin and defining a central aisle laterally between the rows of seats and extending longitudinally across the floor surface between the front of the aircraft cabin and the rear of the aircraft cabin; and,
the toilet and the central aisle being on opposite sides of the lavatory back wall.

6. The aircraft of claim 1, further comprising:
a plurality of rows of seats on the floor surface, the rows of seats being arranged on laterally opposite sides of the aircraft cabin and defining a central aisle laterally between the rows of seats and extending longitudinally across the floor surface between the front of the aircraft cabin and the rear of the aircraft cabin;
a cross-aisle extending laterally across the floor surface between the first sidewall of the aircraft cabin and the second sidewall of the aircraft cabin, the central aisle intersecting the cross-aisle; and,
the lavatory back wall and the lavatory aft sidewall being positioned adjacent the intersection of the central aisle and the cross-aisle.

7. The aircraft of claim 1, further comprising:
the first sidewall of the aircraft cabin, the lavatory forward sidewall, the lavatory back wall and the lavatory aft sidewall extending around and enclosing the lavatory enclosure.

8. An aircraft comprising:
an aircraft body containing an aircraft cabin, the aircraft cabin having a longitudinal length between a front of the aircraft cabin and a rear of the aircraft cabin, and the aircraft cabin having a lateral width between opposite first and second sidewalls of the aircraft cabin;
a floor surface in the aircraft cabin;
the first sidewall of the aircraft cabin curving laterally inwardly over the aircraft cabin as the first sidewall of the aircraft cabin extends vertically upwardly from the floor surface;
a lavatory enclosure in the aircraft cabin, the lavatory enclosure having a lavatory back wall that extends vertically upwardly from the floor surface and is laterally spaced from the first sidewall of the aircraft cabin, the lavatory back wall and the first sidewall of the aircraft cabin being laterally opposite walls of the lavatory enclosure; and,
a toilet in the lavatory enclosure, the toilet being positioned on the floor surface adjacent the lavatory back wall and laterally spaced from the first sidewall of the aircraft cabin, the toilet having a front and a back, and the toilet being positioned in the lavatory enclosure with the front of the toilet facing toward the first sidewall of the aircraft cabin and the back of the toilet facing toward the lavatory back wall.

9. The aircraft of claim 8, further comprising:
the lavatory back wall being substantially flat.

10. The aircraft of claim 8, further comprising:
the lavatory enclosure having a doorway; and,
there being an open area of the floor surface dimensioned to accommodate a wheelchair inside the lavatory enclosure, the open area of floor surface being laterally between the toilet and the first sidewall of the aircraft cabin and longitudinally adjacent the doorway.

11. The aircraft of claim 8, further comprising:
a plurality of rows of seats on the floor surface, the rows of seats being arranged on laterally opposite sides of the aircraft cabin and defining a central aisle laterally between the rows of seats and extending longitudinally across the floor surface between the front of the aircraft cabin and the rear of the aircraft cabin; and,
the lavatory enclosure being positioned in the aircraft cabin rearwardly of one of the rows of seats.

12. The aircraft of claim 8, further comprising:
a plurality of rows of seats on the floor surface, the rows of seats being arranged on laterally opposite sides of the aircraft cabin and defining a central aisle laterally between the rows of seats and extending longitudinally across the floor surface between the front of the aircraft cabin and the rear of the aircraft cabin; and, the toilet and the central aisle being on opposite sides of the lavatory back wall.

13. The aircraft of claim 8, further comprising:

the first sidewall of the aircraft cabin, the lavatory forward sidewall, the lavatory back wall and the lavatory aft sidewall extending around and enclosing the lavatory enclosure.

14. An aircraft comprising:

an aircraft body containing an aircraft cabin, the aircraft cabin having a longitudinal length between a front of the aircraft cabin and a rear of the aircraft cabin, and the aircraft cabin having a lateral width between opposite first and second sidewalls of the aircraft cabin;

a floor surface in the aircraft cabin;

the first sidewall of the aircraft cabin curving laterally inwardly over the aircraft cabin as the first sidewall of the aircraft cabin extends vertically upwardly from the floor surface;

a lavatory enclosure in the aircraft cabin;

a lavatory back wall in the aircraft cabin, the lavatory back wall being laterally spaced from the first sidewall of the aircraft cabin, the lavatory back wall and the first sidewall of the aircraft cabin being laterally opposite walls of the lavatory enclosure, the lavatory back wall extending vertically upwardly from the floor surface and extending longitudinally through the aircraft cabin between a forward edge of the lavatory back wall and a rearward edge of the lavatory back wall;

a lavatory forward sidewall in the aircraft cabin, the lavatory forward sidewall extending vertically upwardly from the floor surface and extending laterally through the aircraft cabin between the first sidewall of the aircraft cabin and the forward edge of the lavatory back wall;

a lavatory aft sidewall in the aircraft cabin, the lavatory aft sidewall extending vertically upwardly from the floor surface and extending laterally between the first sidewall of the aircraft cabin and the rearward edge of the lavatory back wall, the lavatory forward sidewall and the lavatory aft sidewall being longitudinally opposite walls of the lavatory enclosure;

a toilet in the lavatory enclosure, the toilet being positioned on the floor surface adjacent the lavatory back wall and laterally spaced from the first sidewall of the aircraft cabin, the toilet having a front and a back with the toilet back facing the lavatory back wall and the toilet front facing the first sidewall of the aircraft cabin; and, an open area of the floor surface in the lavatory enclosure between the first sidewall of the aircraft cabin and the toilet, the open area of the floor surface being dimensioned to accommodate a wheelchair on the open area of the floor surface.

15. The aircraft of claim 14, further comprising:

a doorway in the lavatory aft sidewall, the doorway being positioned adjacent the open area of the floor surface dimensioned to accommodate a wheelchair.

16. The aircraft of claim 15, further comprising:

a plurality of rows of seats on the floor surface, the rows of seats being arranged on laterally opposite sides of the aircraft cabin and defining a central aisle extending longitudinally across the floor surface between the front of the aircraft cabin and the rear of the aircraft cabin and between the rows of seats;

a cross-aisle extending laterally across the floor surface between the first sidewall of the aircraft cabin and the second sidewall of the aircraft cabin, the cross-aisle intersecting the central aisle; and, the cross-aisle and the toilet being on longitudinally opposite sides of the lavatory aft sidewall with the doorway in the aft sidewall being positioned between the lavatory and the cross-aisle.

17. The aircraft of claim 16, further comprising:

the doorway in the lavatory aft sidewall being positioned between the cross-aisle and the open area of the floor surface dimensioned to accommodate a wheelchair in the lavatory enclosure.

18. The aircraft of claim 14, further comprising:

the back of the toilet being positioned adjacent the lavatory back wall and the front of the toilet being positioned adjacent the open area of the floor surface dimensioned to accommodate a wheelchair in the lavatory enclosure.

19. The aircraft of claim 14, further comprising:

the lavatory back wall being substantially flat.

20. The aircraft of claim 19, further comprising:

the first sidewall of the aircraft cabin curving over the open area of the floor surface as the first sidewall of the aircraft cabin extends vertically upwardly from the floor surface.

* * * * *